T. ROBERTS.
BOTTLE FILLING MACHINE.
APPLICATION FILED JULY 24, 1906.
931,344.
Patented Aug. 17, 1909.
7 SHEETS—SHEET 3.
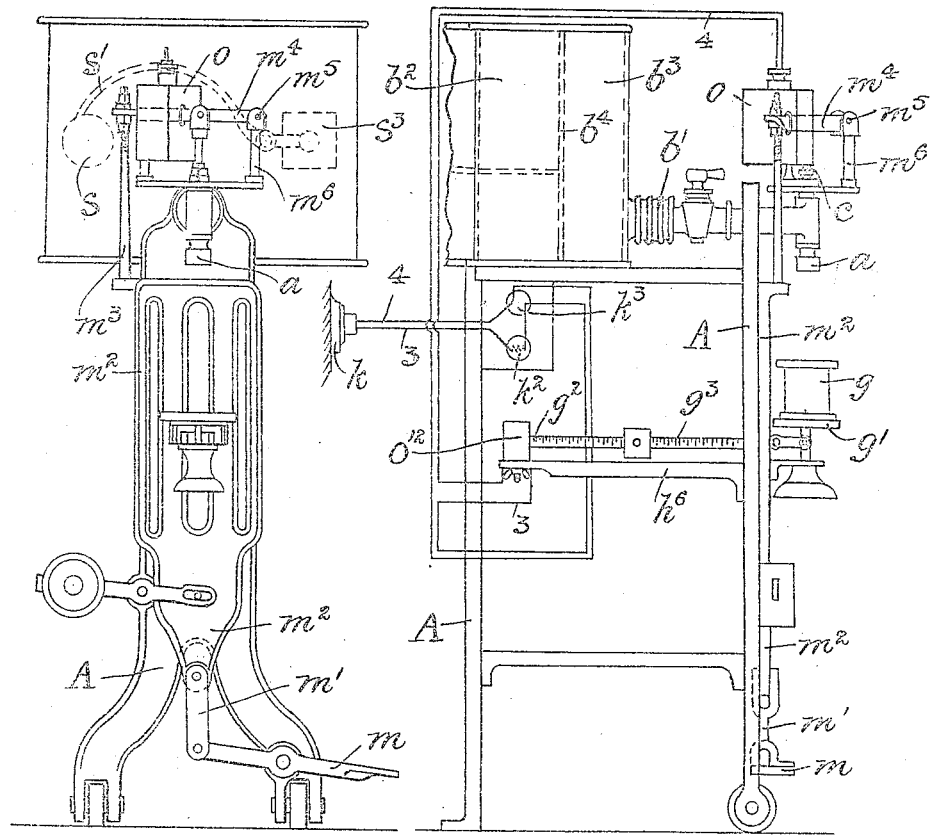
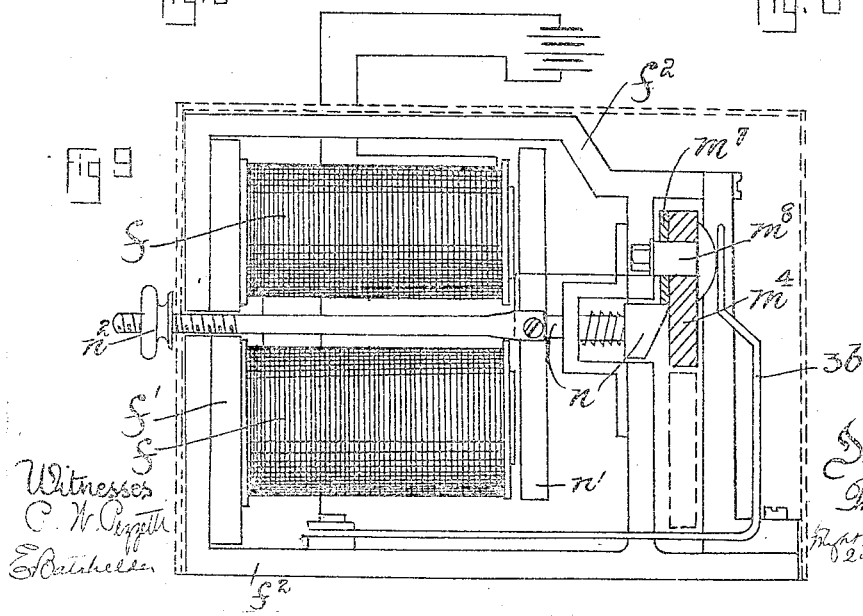

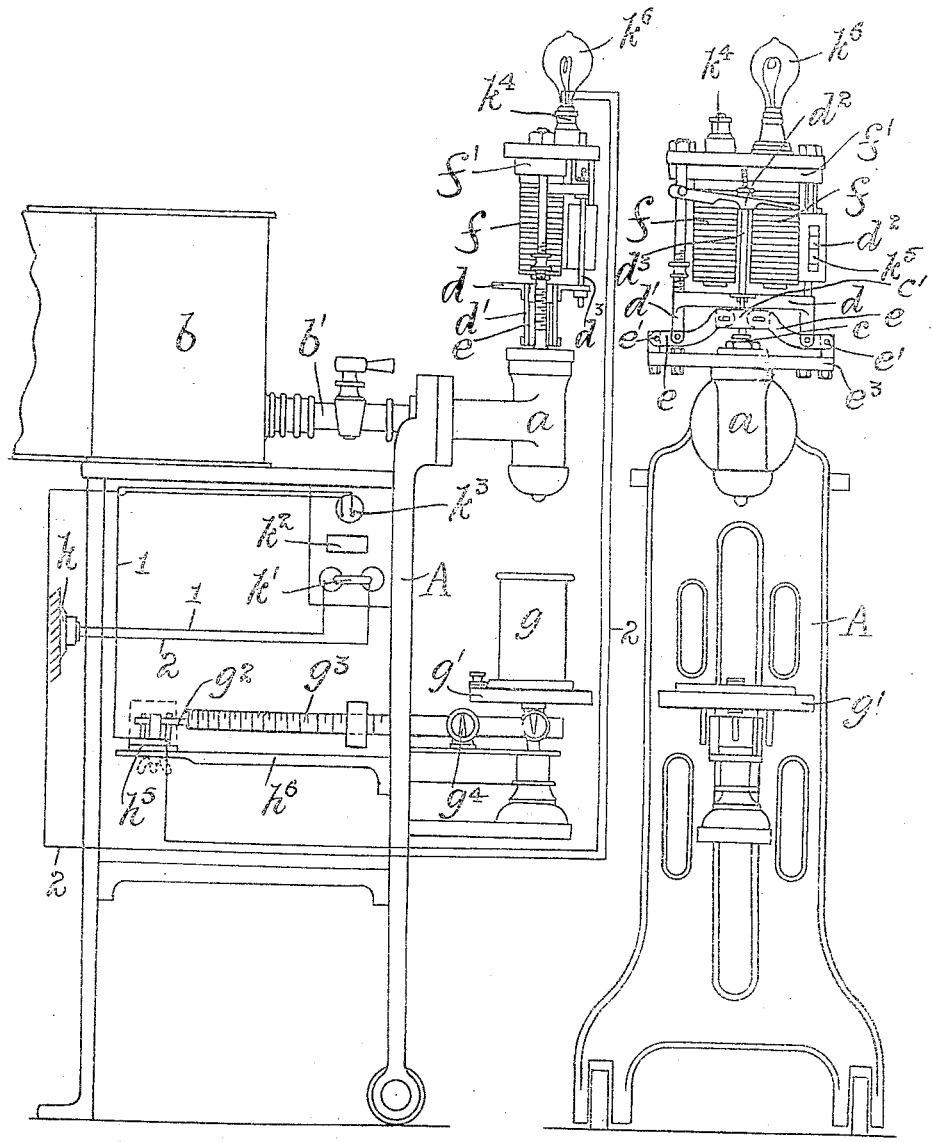

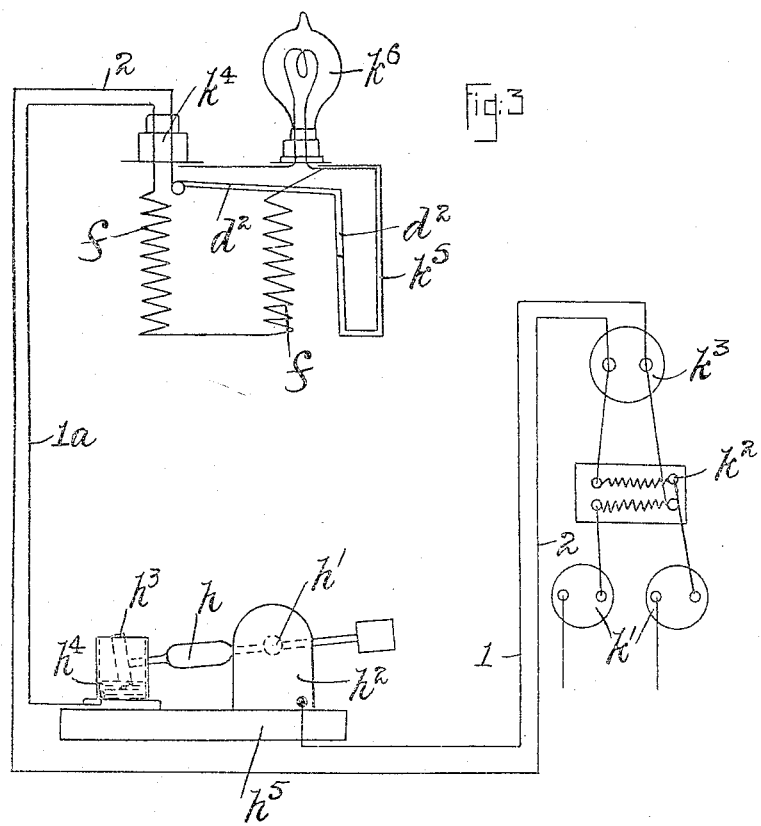
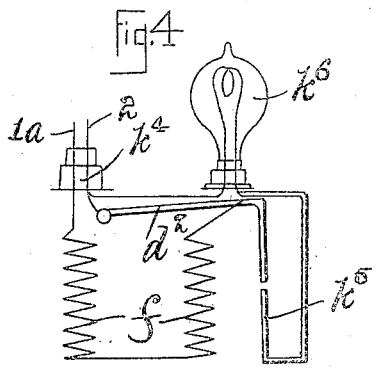

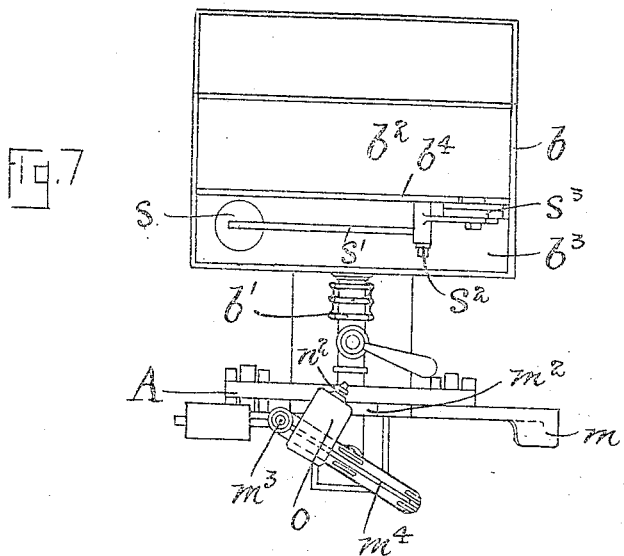
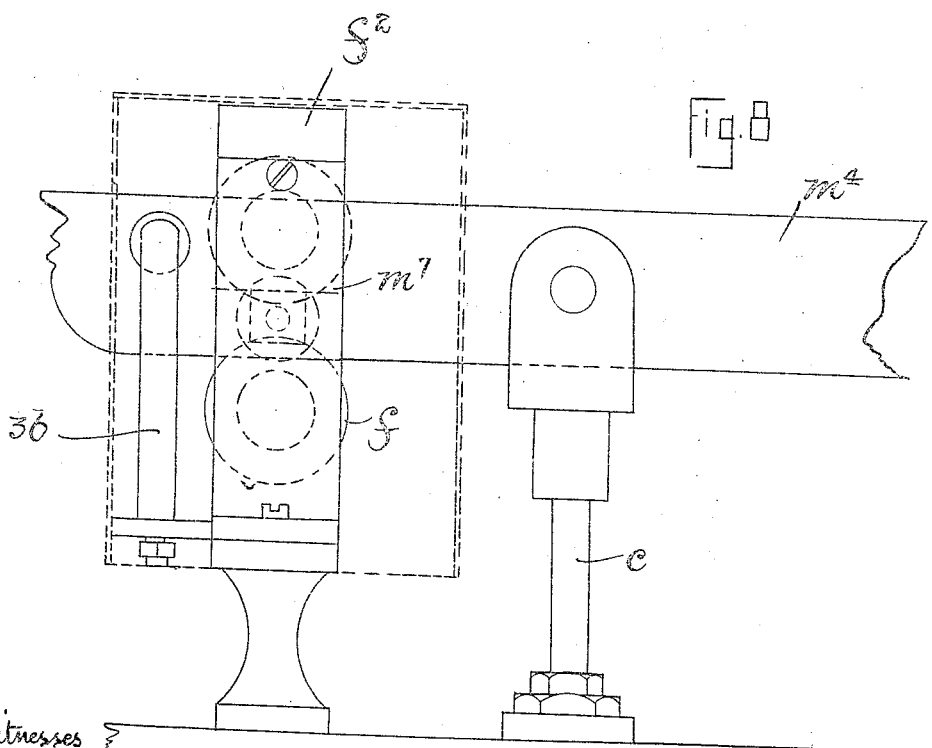

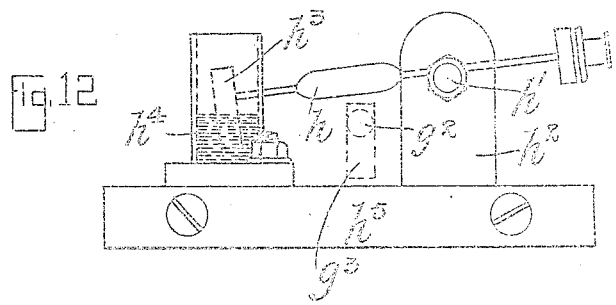
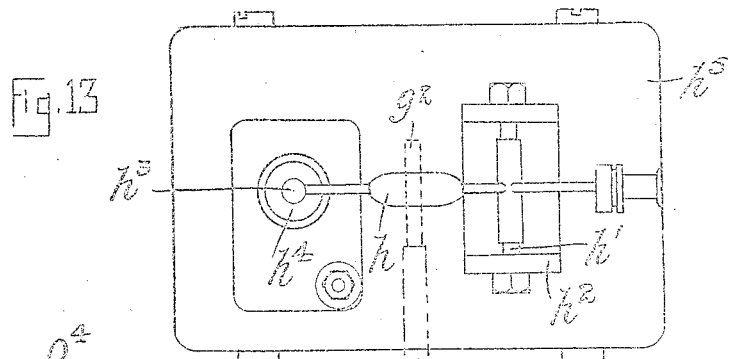
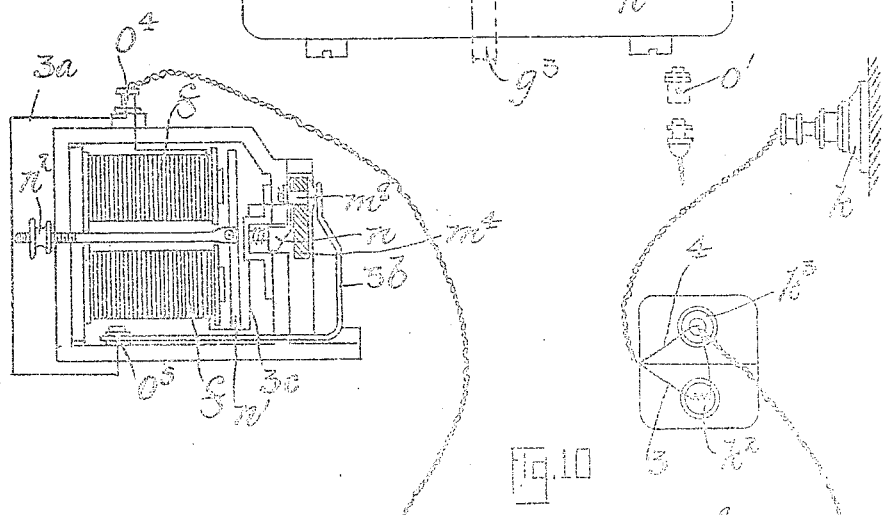
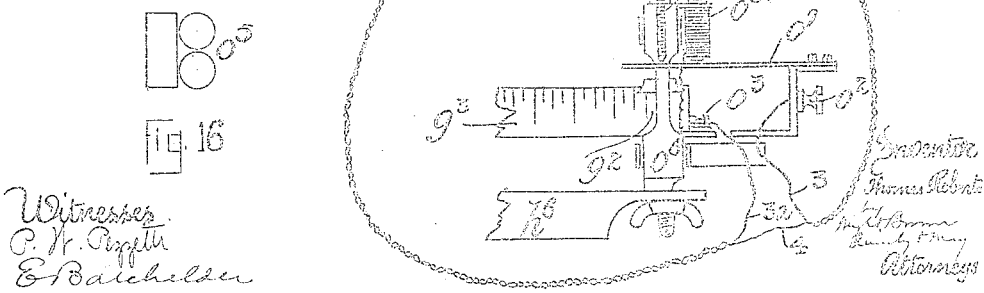

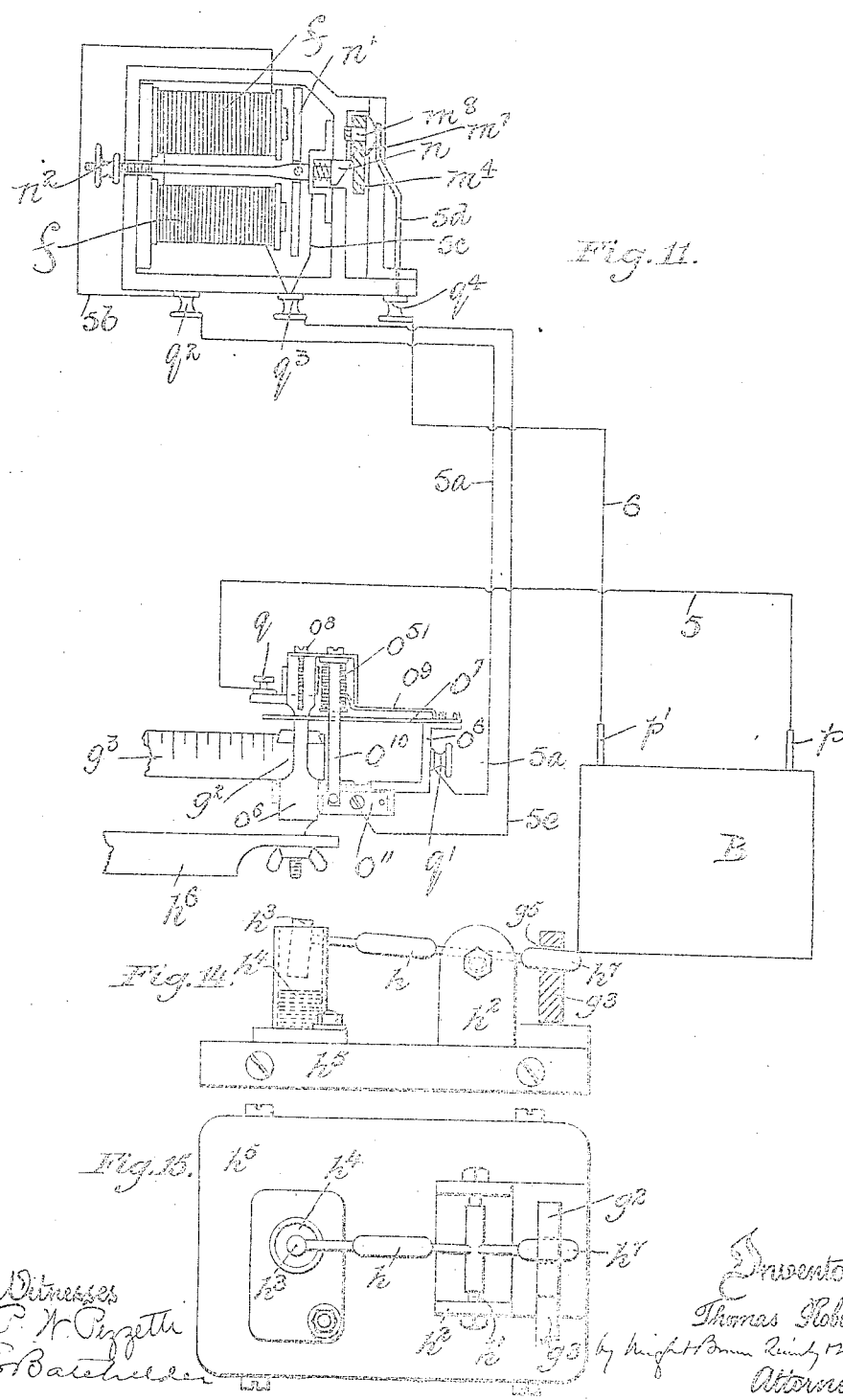

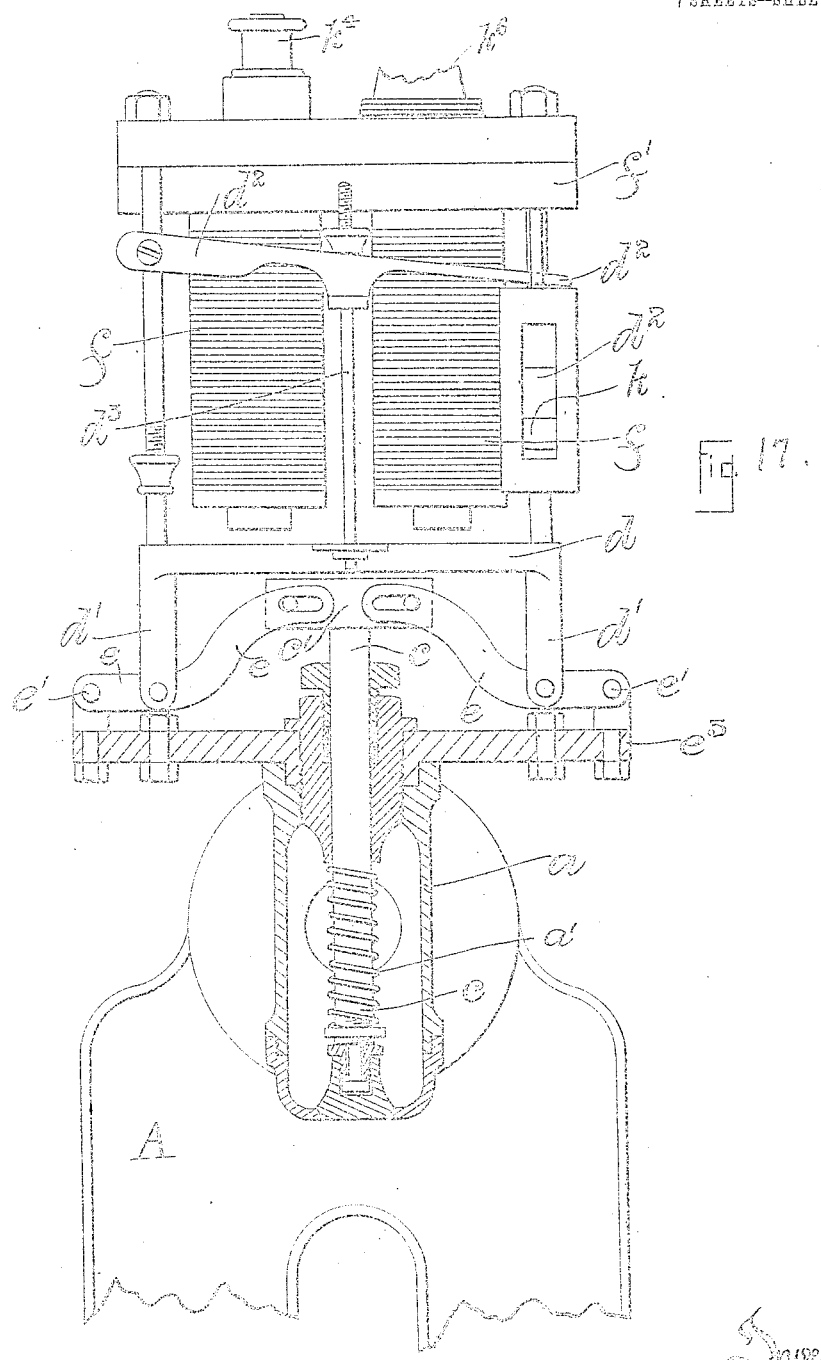

UNITED STATES PATENT OFFICE.

THOMAS ROBERTS, OF BOLTON, ENGLAND.

BOTTLE-FILLING MACHINE.

No. 931,344.     Specification of Letters Patent.     Patented Aug. 17, 1909.

Application filed July 24, 1906. Serial No. 327,597.

*To all whom it may concern:*

Be it known that I, THOMAS ROBERTS, a subject of the King of Great Britain, and resident of 33 Deane road, Bolton, in the county of Lancaster, England, have invented a certain new and useful Improvement in Bottle-Filling Machines, of which the following description, together with the several sheets of drawings, is a specification.

This invention relates to machines for use in filling bottles, jars, cans and like receptacles with liquid or semi-liquid substances and especially to the class of machines wherein the quantity at each filling operation is regulated by the completion or the breakage of an electrical circuit, and consists in arranging devices whereby the valves may be operated through a greater space by the electro-magnets used and with an expenditure of less current or electrical energy than heretofore when said current is employed for opening and retaining the valve in its open position during the filling operations, whereas when the current is employed for closing the valves on the completion of the filling operations then I employ in connection therewith devices which may be readily adjusted to retain the valves in their open position as desired or which may be entirely cut out so that the machine may be used and operated by the attendant without electrical energy, and in connection with the latter arrangement of devices I make use of a contact maker so constructed as to be more effective in its actions than heretofore.

In the accompanying sheets of drawings, which are illustrative of my said invention:—

Figures 1 and 2 are front and side views respectively of a machine of the class wherein the electric current is employed for opening and retaining the valve in its open position during the filling operations, such machines having my improvements applied thereto. Figs. 3 and 4 are diagrams illustrating the method of "wiring" or arranging the electrical circuit in said machine. Figs. 5, 6 and 7 are front, side and top views respectively illustrating the application of my improvements to a machine wherein the electrical current is employed for closing the valve on the completion of the filling operations. Figs. 8 and 9 are front and part sectional side elevations respectively of parts of said machine hereinafter described, and are drawn to an enlarged scale. Figs. 10 and 11 are diagrams illustrating different forms of "wiring" or arranging the electrical circuit in connection with this form of machine. Figs. 12 and 13 are side elevations and plan respectively, on an enlarged scale, of a form of contact maker hereinafter described. Figs. 14 and 15 are side elevation and plan respectively of a modified form of contact maker hereinafter described. Fig. 16 is a drawing in detail hereinafter referred to. Fig. 17 is a detail elevation, enlarged, showing the filling head and its valve in section.

Similar figures and letters of reference indicate like parts throughout the several views.

A indicates the framework of the machine.

In carrying my invention into effect I make use of a filling head $a$ which is supplied with liquid from the tank or receptacle $b$ through the pipe or tube $b'$. Within the head $a$ is mounted a valve to which is connected the spindle $c$ and said valve is normally held in its closed position by a spring $a'$ also preferably mounted within said head $a$. Mounted above the spindle $c$ is the cross piece $d$, arms $d'$ on which reach into connection with the levers $e$ fulcrumed at $e'$ to the stationary plate $e^2$ and connected also by pins and slots to the part $c'$ fixed upon the valve spindle $c$. Mounted upon the plate $f'$ are the electro-magnets $f$ which reach into close proximity to the cross-piece $d$ so that when an electrical circuit is completed in the manner hereinafter described said electro-magnets $f$ will raise the cross-piece $d$ and the supply valve against the tension of its retracting spring, and owing to the arrangement of lever connections $e$ the movement transmitted to the valve will be greatly in excess of that given to the armature or cross piece $d$ which actuates said levers $e$. In this manner the current required to raise the valve a considerable distance is very much less than would be required to move said valve through the same distance provided that the armature or cross-piece was mounted upon the spindle $c$.

The receptacle $g$ to be filled is mounted upon the scale pan $g'$ beneath the filling head $a$ and the end $g^2$ of the beam $g^3$ (which is fulcrumed at $g^4$) is arranged to operate a contact maker or breaker to cause the breaking or making of an electrical circuit as hereinafter described. This contact maker or breaker consists of a weighted lever $h$ pivoted at $h'$ in bearings $h^2$ and having its end $h^3$ movable within the cup or well $h^4$ containing mercury. The bearings $h^2$ and cup $h^4$ are insulated from each other, and are fixed upon the plate $h^5$ which is carried by the arm $h^6$.

The electric wires or conductors 1 and 2 extend from a wall bracket or other suitable source of supply $k$ and pass through the switch $k'$, fuse box $k^2$ and plug $k^3$, the wire 1 being thereafter connected to the bearings $h^2$ while its other part or continuation $1^a$ passes from the cup $h^4$ through the plug $k^4$ to the electro-magnets $f$ and then to the contact piece $k^5$. The wire 2 is connected through the plug $k^4$ and lamp $k^6$ (or other equivalent resistance) to said contact piece $k^5$ and also to the lever $d^2$. This lever is moved by a rod $d^3$ fixed to the plate $d$.

The actions of the machine are as follows:—On an empty receptacle $g$ being placed on the scale pan $g'$ and the switch $k'$ operated to supply a current of electricity from the mains, an electric circuit is completed from the plug $k^3$ through the wire 1, bearings $h^2$, lever $h$, the mercurial contact $h^3$, wire $1^a$, electro-magnets $f$, contact piece $k^5$, lever $d^2$ and wire 2 back to the plug $k^3$. This causes the electro-magnets $f$ to immediately raise the armature $d$ and consequently the valve in the filling head $a$ and so supply liquid to the receptacle $g$. This movement of the armature also raises the contact lever $d^2$ thus breaking the contact between it and the part $k^5$ (see Fig. 4) in this manner causing the current to pass from the electro-magnets $f$ through the lamp $k^6$ to the conductor 2. The lamp $k^6$ thus absorbs any excess of current that might otherwise injure the other parts of the apparatus, and the current will pass therethrough until the receptacle $g$ has received its predetermined quantity of liquid by the weight of which it causes the beam $g^3$ to oscillate so that its end $g^2$ raises the end $h^3$ of the lever $h$ from contact with the mercury in the receptacle $h^4$ and this breaks the circuit, on which the valve in the head $a$ is allowed to be closed by its spring.

In the form of machine wherein the valve is closed by the electro-magnets on the completion of the filling operations, the valve spindle $e$ is raised by the foot of the operator through the treadle lever $m$, link $m'$, slide $m^2$, rod $m^3$ and the lever $m^4$ which is fulcrumed at $m^5$ to the pillar $m^6$ and which is connected to said spindle $e$. This spindle is retained in its raised position by the spring-controlled bolt $n$ which takes beneath the plate $m^7$ of the lever $m^4$ and is connected to the armature $n'$. Mounted upon the plate $f'$ are the electro-magnets $f$, said plate $f'$ and the other parts being supported by the framework $f^2$, and over all these parts is placed the cover $o$. The bolt $n$ extends through this cover $o$ and has a screwed nut $n^2$ mounted upon its outer end. The withdrawal of the bolt $n$ by the movement of the armature $n'$ on the completion of an electrical circuit as hereinafter described allows the lever $m^4$ to be lowered by gravity or the actions of a spring.

In making use of a current of electricity of high electromotive force or high tension, I connect the ends of the conductors 3 and 4 to the wall bracket $k$ or lamp socket or connection $o'$. One of them (3) is then connected to the fuse box $k^2$ and passes therefrom through the plug connection $k^3$ to the terminal $o^2$. To the terminal $o^3$ is connected the remaining part $3^a$ of said conductor 3 which by the plug connection $o^4$ passes to the terminal $o^5$ to which is connected the conductor $3^b$. When the lever $m^4$ is in its raised position a stud $m^8$ fixed therein makes contact with the conductor $3^b$ said stud being connected to the electro-magnet $f$ through the flexible connection or wire $3^c$. To the other end of the electro-magnets $f$ is connected the wire 4 which passes to the plug connection $k^3$ and thence to the wall bracket $k$ or lamp connection $o'$. The terminal $o^3$ is connected to the electro-magnets $o^{51}$ which are supported by the framework $o^6$ upon which is also mounted the strip or contact-maker $o^7$. It will thus be seen that when the lever $m^4$ is in its raised position the supply valve will be open for the supplying of liquid to the receptacle $g$ and that upon the weight of liquid in said receptacle causing the end $g^2$ of the balance $g^3$ to move or raise the strip $o^7$ into contact with the electro-magnets $o^5$ and stud $o^8$ an electrical circuit will be completed through the parts above described and that the electro-magnets $f$ will be energized thus causing the armature $n'$ to withdraw the bolt $n$ from beneath the part $m^7$ of the lever $m^4$ in this manner allowing it to fall and break the circuit through the stud $m^8$ moving away from the conductor $3^b$.

When making use of accumulators B as the source of electrical energy, I arrange the connections as shown by Fig. 11 so that on the receptacle $g$ having received its supply of liquid the strip $o^7$ is raised into contact with the screw $o^8$ and electro-magnet $o^{51}$, two electrical circuits are completed, one in shunt with the other, the primary or main circuit passing from the terminal $p$ through the conductor 5 to the terminal $q$, through the screw $o^8$ (which is insulated from the coils $o^{51}$), the strip $o^7$, framework $o^6$, terminal $q'$, conductor $5^a$ terminal $q^2$, conductor $5^b$, through the coils $f$ to the terminal $q^3$, then by the conductor $5^c$ to the stud $m^8$, and forward through the conductor $5^d$ to the terminal $q^4$, thence through the conductor 6 to the terminal $p'$ of the battery B. The shunt circuit extends from the strip $o^7$ through the connection $o^9$ to the coils $o^{51}$, then by way of the plates $o^{10}$, $o^{11}$ and the conductor $5^e$, terminal $q^3$, through the conductor $5^c$, stud $m^8$ and conductor $5^d$ to the terminal $q^4$. The magnets $f$ will by these means be energized, the bolt $n$ withdrawn, and the circuit broken as hereinbefore described.

By rotating the nut $n^2$ the bolt $n$ may be adjusted in position or it may be withdrawn from projecting beneath the lip $m^7$ so that the machine may be used without the employment of the electrical devices hereinbefore described for causing the closing of the valve. In this latter form of machine instead of making use of the kind of circuit closing and breaking devices as illustrated by Figs. 10 and 11, I may employ a "mercurial contact" device, similar to that shown by Figs. 12 and 13 and as hereinbefore described, however in this case I arrange the outer end $h^7$ of the lever $h$ to take through an opening $g^5$ in the beam $g^3$ (see Figs. 14 and 15) so that the rising of said beam on the receptacle $g$ having received its desired quantity of liquid will cause the part $h^3$ to be moved into the mercury in the cup $h^4$ thus completing the circuit as desired to cause the withdrawal of the bolt $n$ from beneath the part $m^7$ as hereinbefore described.

I divide the tank $b$ into two compartments $b^2$ and $b^3$ by means of the partition $b^4$ and within the part $b^3$ I mount the ball or float $s$ upon the lever $s'$ fulcrumed at $s^2$ and carrying a plate or sluice valve $s^3$ which covers an opening made in the partition $b^4$ so that the level of the water in the compartment $b^3$ is kept constant.

My improved devices or portions of them are equally applicable to apparatus wherein the amount of liquid to be filled into the receptacle is regulated by the weight thereof and wherein the circuit is completed or broken by the arm of a scale pan or balance, as illustrated by the accompanying sheets of drawings, or to apparatus in which the circuit is completed on the liquid in the receptacle having reached a predetermined height, when the electrical circuit is completed through such liquid.

Such being the nature and object of my invention what I claim is:—

1. In a bottle filling machine, a filling head, means for supplying liquid thereto, a valve mounted within said filling head, a valve spindle, electro-magnets having an armature, a system of levers intervening between said armature and the valve spindle whereby the movement transmitted to said spindle by said armature is greatly increased, means, whereby said spindle is operated at the completion of an electrical circuit, and means whereby said spindle is operated at the breakage of an electric circuit substantially as herein specified.

2. In a bottle filling machine, a filling head, means for supplying liquid thereto, a valve mounted within said filling head, a valve spindle, an electro-magnet having an armature, lever connections between the armature and spindle for increasing the movement of the spindle relatively to the armature which transmits movement to said valve spindle, devices whereby an electrical circuit is completed and broken, and means operated by said armature by which an electrical lamp or other resistance is brought into said electrical circuit, substantially as herein specified.

3. In a bottle filling machine, a filling head, means for supplying liquid thereto, a valve mounted within said filling head, a valve spindle having a spring thereon for normally retaining the valve in a closed position, an armature having a compound lever connection with the valve stem, and means for actuating said armature to raise said valve spindle against the tension of the spring mounted thereon.

In testimony whereof I have hereunto affixed my signature in presence of two witnesses.

THOMAS ROBERTS.

Witnesses:
   J. H. ELLISON,
   JOHN WHITEHEAD.